Figure 1:
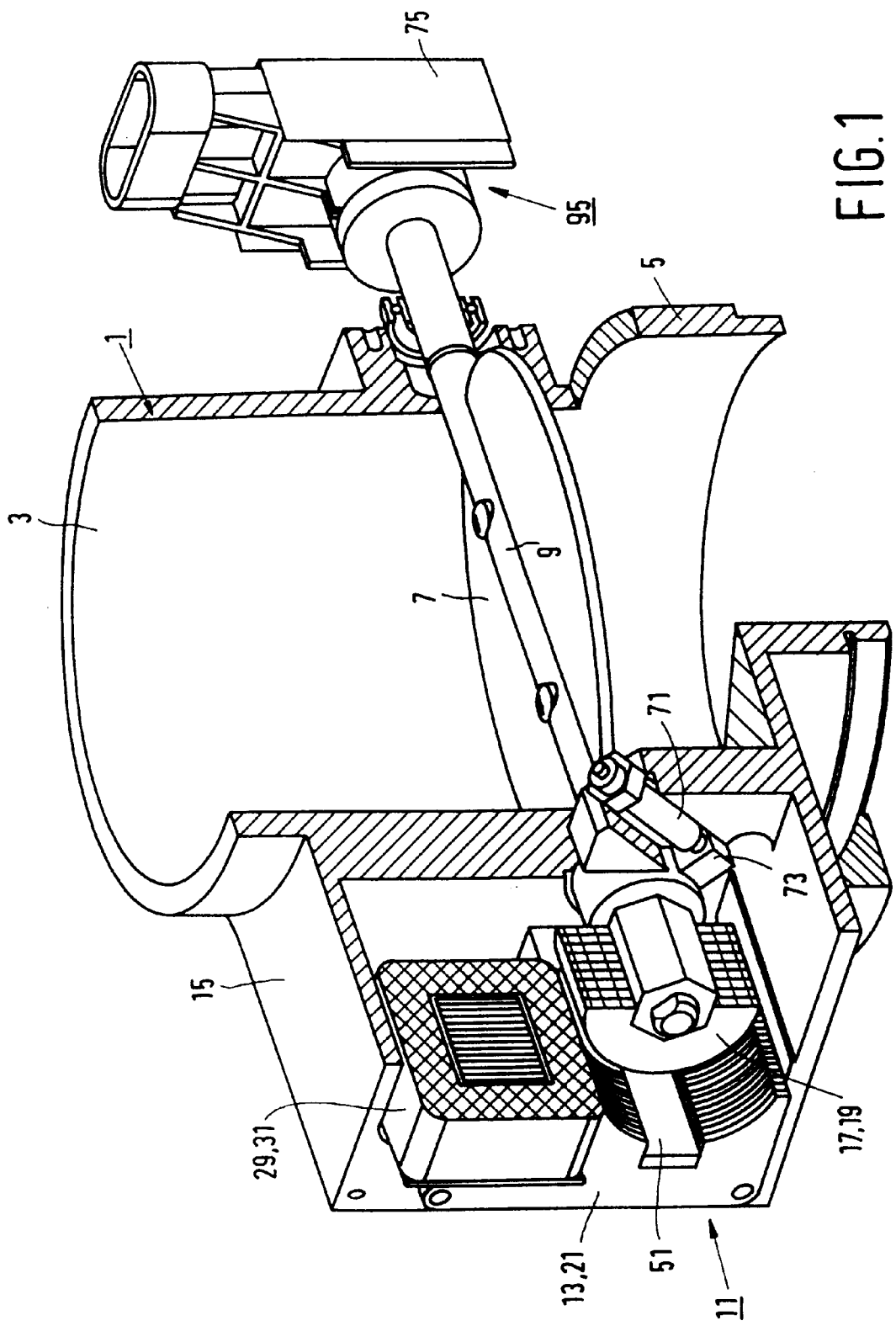

United States Patent [19]
Scholten et al.

[11] Patent Number: 5,992,383
[45] Date of Patent: *Nov. 30, 1999

[54] CONTROL UNIT HAVING A DISTURBANCE PREDICTOR, A SYSTEM CONTROLLED BY SUCH A CONTROL UNIT, AN ELECTRICAL ACTUATOR CONTROLLED BY SUCH A CONTROL UNIT, AND THROTTLE DEVICE PROVIDED WITH SUCH AN ACTUATOR

[75] Inventors: Lutz Scholten, Aachen; Rudolf Tracht, Dortmund, both of Germany

[73] Assignee: U.S. Philips Corporation, New York, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/833,890

[22] Filed: Apr. 10, 1997

[30] Foreign Application Priority Data

May 28, 1996 [EP] European Pat. Off. ............... 96201451

[51] Int. Cl.[6] .............................. F02D 11/10; G05B 13/04
[52] U.S. Cl. .................... 123/399; 251/129.04; 318/561; 318/601; 364/165
[58] Field of Search ....................... 123/399; 251/129.04; 318/561, 600, 601, 632; 364/149, 150, 151, 158, 165; 701/115

[56] References Cited

U.S. PATENT DOCUMENTS 5,408,406   4/1995   Mathur et al. ........................... 364/149
5,454,358  10/1995   Hattori et al. ........................... 123/399
5,498,943   3/1996   Kimoto et al. ........................... 318/601

FOREIGN PATENT DOCUMENTS

WO9534903  12/1995   WIPO .

OTHER PUBLICATIONS

"Accurate Motion Controller Design Based on an Extended Pole Placement Method and a Disturbance Observer", Hendrik Van Brussel et al, Annals of the CIRP, vol. 43, No. 1, 1994.

*Primary Examiner*—Andrew M. Dolinar
*Attorney, Agent, or Firm*—Leroy Eason

[57] ABSTRACT

A control unit (75) for controlling a first state variable of a system, for example an angle of rotation $\phi$ of a throttle valve (7) in a throttle device for use in an internal-combustion engine, the system being influenced by a disturbance variable during operation, for example an oscillating loading torque caused by air-flow fluctuations in the throttle device. The control unit includes a disturbance observer (125) for calculating a value of the disturbance variable at a first point in time on the basis of a mathematical model of the system, and a disturbance predictor (128) for predicting a value of the disturbance variable at a second point in time which follows the first point in time by a predetermined time interval. In this manner, a phase shift between the disturbance variable actually influencing the system and the compensation provided by the system for the disturbance variable is prevented at high frequencies of the disturbance variable.

6 Claims, 8 Drawing Sheets

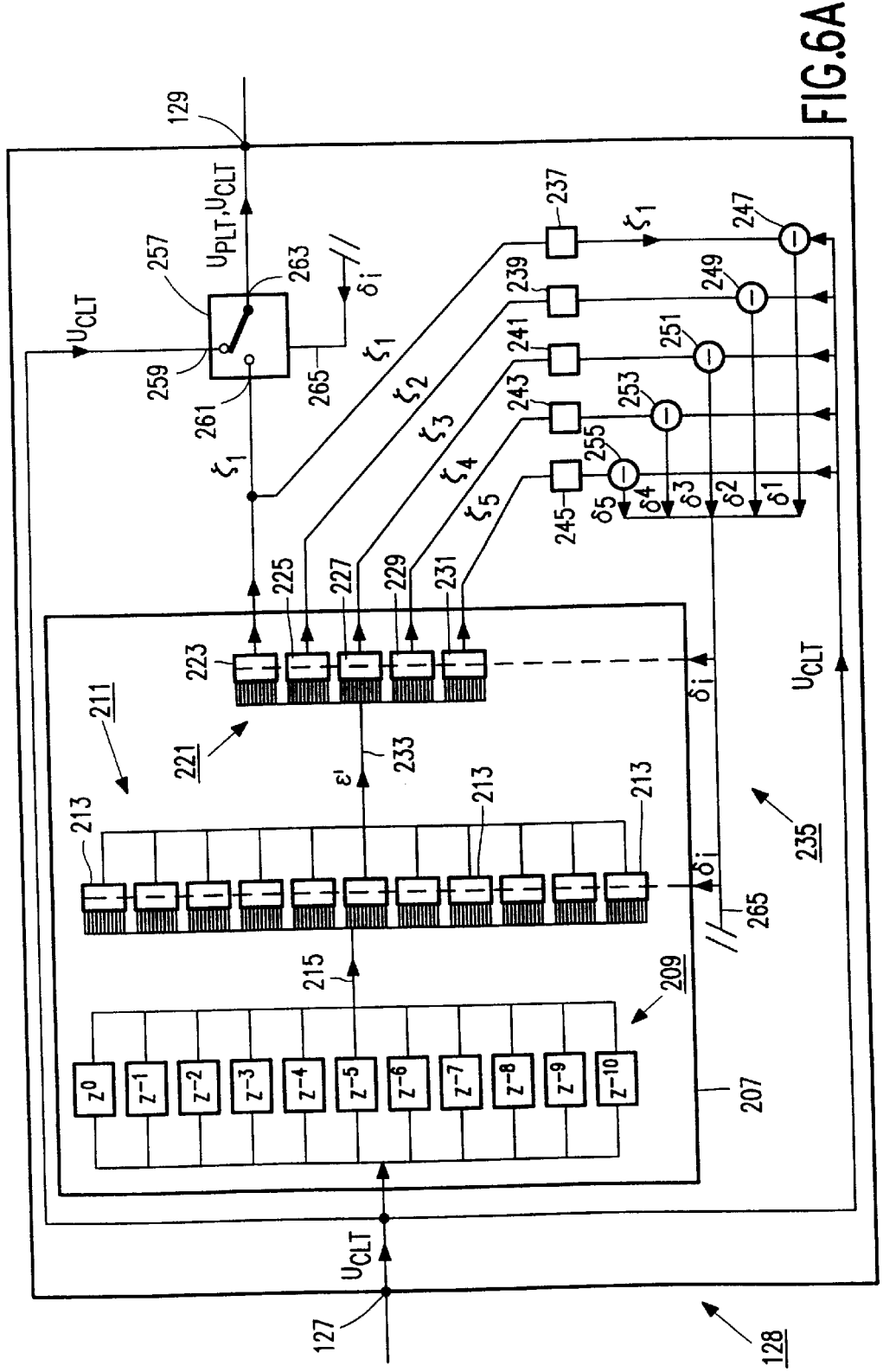

CONTROL UNIT HAVING A DISTURBANCE PREDICTOR, A SYSTEM CONTROLLED BY SUCH A CONTROL UNIT, AN ELECTRICAL ACTUATOR CONTROLLED BY SUCH A CONTROL UNIT, AND THROTTLE DEVICE PROVIDED WITH SUCH AN ACTUATOR

The invention relates to a control unit for controlling a first state variable of a system which is influenced by a disturbance variable during operation, which control unit comprises a disturbance observer for calculating the disturbance variable on the basis of a mathematical model of the system, the disturbance observer having at least one input for receiving an input signal corresponding to a second state variable of the system which is measurable and an output for supplying an output signal corresponding to a value of the disturbance variable calculated at a first point in time.

The invention further relates to a system comprising a control unit for controlling a first state variable of the system which is influenced by a disturbance variable during operation, and a measuring device for measuring at least a second state variable of the system.

The invention also relates to an electrical actuator comprising a first actuator body, a second actuator body which is pivotable relative to the first actuator body through an angle of rotation about an axis of rotation, electrical energizing means for exerting an electromagnetic torque on the second actuator body, and a control unit for controlling the angle of rotation of the second actuator body, said control unit comprising an input for receiving an input signal corresponding to a required angle of rotation of the second actuator body and an output for supplying an output signal corresponding to a required electrical current through the energizing means.

The invention further relates to a throttle device for use in an air inlet of an internal-combustion engine, which throttle device comprises a throttle-valve housing, an air passage which is connectable to the air inlet, a throttle valve which is journalled in the throttle-valve housing so as to be pivotable in the air passage, and an electrical actuator for pivoting the throttle valve.

A control unit and a system of the kinds mentioned in the opening paragraphs are known from the paper "Accurate Motion Controller Design Based on an Extended Pole Placement Method and a Disturbance Observer" by H. Van Brussel et al., published in Annals of the CIRP, Vol. 43, no. 1, 1994. The known control unit is a motion control unit for controlling a position of a driving device in a machine tool. The position of said driving device is influenced during operation by internal disturbance variables such as friction and stiction forces existing in mechanical interfaces like bearings, and by external disturbance variables such as cutting forces occurring during metal removal operations. Such disturbance variables are measurable only with great difficulty. The disturbance observer of the known control unit is used to calculate the disturbance variable on the basis of a mathematical model of the driving device and the machine tool, i.e. on the basis of a set of first-order differential equations describing the physics of the system to be controlled. The output signal of the disturbance observer corresponding to a calculated value of the disturbance variable is supplied to a summing point of the known control unit which adds together said output signal of the disturbance observer, a feed-forward control signal supplied by a feed-forward control loop of the control unit, and a feedback control signal supplied by a feedback control loop of the control unit. In this manner, the feedback control loop needs to compensate only for a deviation between the calculated value of the disturbance variable and a value of the disturbance variable actually influencing the system, so that the disturbance is quickly compensated for by the control unit.

A drawback of the known control unit and system is that the control unit does not accurately compensate for oscillating disturbances having relatively high frequencies owing to a time delay between a point in time at which the disturbance is calculated by the disturbance observer and a further point in time at which the system to be controlled actually realizes a compensation of the calculated disturbance, said time delay being determined by characteristics of the control unit and the system. In consequence of this, the system even gets into resonance if the oscillating disturbances have a frequency near a resonance frequency of the system. Since said time delay is not only determined by characteristics of the control unit but also by characteristics of the system controlled by the control unit, said drawback of the known control unit cannot be avoided by returning the control loops of the control unit.

It is an object of the invention to provide a control unit and a system of the kinds mentioned in the opening paragraphs in which the above-mentioned drawback of the known control unit and system is avoided, so that oscillating disturbances having relatively high frequencies and frequencies near a resonance frequency of the system are accurately compensated for by the control unit.

According to the invention, the control unit is for this purpose characterized in that the output signal of the disturbance observer is supplied to an input of a disturbance predictor which has an output for supplying an output signal corresponding to a value of the disturbance variable predicted for a second point in time which follows the first point in time by a predetermined time interval.

According to the invention, the system is for this purpose characterized in that the control unit applied therein is a control unit according to the invention.

Said predetermined time interval corresponds to a time delay occurring between the first point in time at which the value of the disturbance variable is calculated by the disturbance observer and a further point in time at which a compensation of the disturbance variable calculated at the first point in time is actually realized by the system, said time delay being determined by characteristics of the control unit and the system. In this manner, the value of the disturbance variable predicted by the disturbance predictor at the first point in time and corresponding to the value of the disturbance variable at the second point in time corresponds to the value of the disturbance actually influencing the system at the second point in time, so that the time delay of the control unit and the system is compensated for by the disturbance predictor. In this way, the compensation for the disturbance actually realized by the system is substantially in phase with the disturbance actually influencing the system, so that the control unit accurately compensates for the disturbance even at relatively high frequencies of the disturbance variable and even when the disturbance variable has a frequency near the resonance frequency of the system.

A particular embodiment of a control unit according to the invention is characterized in that the disturbance predictor comprises an artificial neural network having an input memory for storing a number N of values of the disturbance variable ($N \geq 4$) calculated by the disturbance observer at N successive points in time up to and including the first point in time, a number M of intermediate neurons ($M \geq 4$) each supplying a weighted value of the N calculated values of the disturbance variable, and an output neuron for supplying a weighted value of the M weighted values supplied by the intermediate neurons, said weighted value of the output neuron corresponding to the value of the disturbance variable predicted for the second point in time. The artificial neural network predicts the value of the disturbance variable for the second point in time on the basis of the N values of the disturbance variable calculated by the disturbance observer at N successive points in time up to and including the first point in time. If the numbers N and M of the neural network are sufficiently large, for example 10 or larger, very accurate predictions of the disturbance variable are made by the disturbance predictor even when the disturbance variable has a complex harmonic character.

A special embodiment of a control unit according to the invention is characterized in that the disturbance predictor is provided with a backpropagation network which comprises an output memory for storing the value of the disturbance variable predicted for the second point in time and a comparator for determining a deviation between the value of the disturbance variable predicted for the second point in time and a value of the disturbance variable calculated by the disturbance observer at the second point in time, said backpropagation network being adapted for training the neurons of the neural network by means of a calculation of the weighting factors of the neurons in dependence on said deviation. The neurons of the neural network are trained, i.e. the weighting factors of the neurons are calculated by means of, for example, a gradient search method on the basis of the deviation between the value of the disturbance variable predicted by the neural network for the second point in time and the value of the disturbance variable calculated by the disturbance observer at the second point in time. In this manner, the weighting factors of the neurons are adapted when the properties of the disturbance variable such as its frequency or amplitude vary. Thus, the disturbance predictor is a self-learning, robust system which is able to predict the value of the disturbance variable in an accurate manner also when the properties of the disturbance variable vary.

A further embodiment of a control unit according to the invention is characterized in that the neural network comprises a number K of output neurons ($K \geq 1$) for supplying K respective values of the disturbance variable predicted for K successive points in time up to and including the second point in time, while the backpropagation network comprises a separate output memory and a separate comparator for each of the output neurons, the backpropagation network being adapted for training the neurons of the neural network in dependence on the K deviations determined by the K comparators. In this further embodiment of the control unit, the neurons of the neural network are trained on the basis of the K deviations between the K values of the disturbance variable predicted by the neural network for said K successive points in time and K values of the disturbance variable calculated by the disturbance observer for said K successive points in time. If the number K is sufficiently large, the neurons are trained in an efficient manner, so that a time interval necessary to train the neurons is minimized.

A still further embodiment of a control unit according to the invention is characterized in that the backpropagation network is adapted to train the neurons only if the deviation is above a predetermined margin. In this embodiment of the control unit, the values of the disturbance variable predicted by the neural network are continuously compared with the corresponding values of the disturbance variable calculated by the disturbance observer. The time interval necessary to train the neurons is determined by said predetermined margin, a comparatively small value of said margin leading to a comparatively long training time and a very accurate prediction of the disturbance variable, and a comparatively large value of said margin leading to a comparatively short training time and a less accurate prediction of the disturbance variable.

A special embodiment of a control unit according to the invention is characterized in that the disturbance predictor comprises a switch having a first input for receiving the output signal of the disturbance observer, a second input for receiving the weighted value corresponding to the value of the disturbance variable predicted for the second point in time, and an output connected to the output of the disturbance predictor for supplying the output signal of the disturbance observer if the deviation is above the predetermined margin and for supplying a signal corresponding to said weighted value if the deviation is below the predetermined margin. If the deviation is below said margin, the disturbance predictor supplies a signal corresponding to the value of the disturbance variable predicted by the neural network. If the deviation is above said margin, the neural network is in a learning phase and supplies an output signal which might disturb the stability of the control unit. Since the output of the switch is connected to the output of the disturbance observer during the learning phase of the neural network, the output of the predictor will supply a signal corresponding to the value of the disturbance variable calculated by the disturbance observer. In this manner, it is prevented that the output of the predictor supplies a signal supplied by the neural network during the learning phase of the neural network.

An electrical actuator and a throttle device of the kinds mentioned in the opening paragraphs are known from WO 95/34903. The known throttle device is used in an air inlet of an internal-combustion engine of a vehicle and is adjustable by a driver of the vehicle by means of an accelerator pedal, the known actuator being used for actuating the throttle valve of the throttle device by exerting a suitable electromagnetic torque on the throttle valve. The accelerator pedal is not mechanically coupled to the throttle valve of the throttle device, but the electrical actuator is provided with an electrical input for receiving an electrical signal corresponding to a required angle of rotation of the throttle valve in the air passage of the throttle device, said electrical signal being supplied, for example, by an electronic motor-management system which also controls the fuel-injection and ignition systems of the internal-combustion engine. The angle of rotation of the throttle valve in the air passage of the throttle device is adjusted by the motor-management system not only as a function of the accelerator-pedal position, but also as a function of, for example, the r.p.m. of the engine, the inlet-air pressure and temperature, and the engine temperature. In this way, the performance, the fuel consumption and the composition of the exhaust gases of the internal-combustion engine are improved.

During operation the throttle valve of the known throttle device, and consequently the second actuator body of the known electrical actuator are subject to fluctuating disturbing loads which are mainly caused by air-flow oscillations and turbulences. Furthermore, the throttle valve and the second actuator body are subject to disturbing loads caused by mechanical friction of the bearings of the throttle valve and by magnetostatic forces exerted on the second actuator body by the first actuator body. These disturbing loads constitute a disturbance variable which influences the angle of rotation of the throttle valve and is measurable only with great difficulty. Said air-flow oscillations and turbulences are caused by the operating principle of the engine, in particular by the fact that the inlet valves of the combustion chambers of the engine are periodically opened and closed during operation, a frequency of said oscillations being proportional to the engine speed. Said oscillations lead to unwanted pivotal vibrations of the throttle valve in the air passage, which vibrations do not only lead to wear of the bearings of the throttle valve, but also to inaccuracies of the angle of rotation of the throttle valve in the air passage and consequently to inaccuracies of the air flow to the combustion chambers of the engine.

According to the invention, the electrical actuator is characterized in that the control unit applied therein is a control unit in accordance with the invention.

According to the invention, the throttle device is characterized in that the electrical actuator applied therein is an electrical actuator in accordance with the invention.

The disturbance observer and the disturbance predictor of the control unit of the electrical actuator are used to predict the disturbing loads which are exerted on the throttle valve. In this manner, it is achieved that the electrical actuator exerts a compensating electromagnetic torque on the throttle valve which is substantially in phase with the disturbing loads exerted on the throttle valve, so that the control unit accurately compensates for the disturbing loads even at relatively high frequencies of the disturbing loads, i.e. at relatively high engine speeds, and even when the disturbing loads have a frequency near a resonance frequency of the throttle device.

A particular embodiment of an electrical actuator according to the invention is characterized in that the control unit comprises a first control member with an input for receiving the input signal corresponding to the required angle of rotation and an output for supplying a signal corresponding to a required electromagnetic torque on the second actuator body, and a second control member with an input for receiving the signal corresponding to the required electromagnetic torque and an output for supplying the output signal corresponding to the required current, wherein the first control member incorporates the disturbance observer and the disturbance predictor, the disturbance observer calculating a loading torque exerted on the second actuator body. The control unit of the actuator in this embodiment, is provided with a so-called cascade control structure wherein the first control member allows for a specific calculation of the required electromagnetic torque, taking into account the mechanical properties of the actuator and the disturbing loading torque predicted by the disturbance predictor, while the second control member allows for a specific calculation of the required current taking into account the electromagnetic properties of the actuator. Since the mechanical properties of the actuator and the loading torque on the one hand and the electromagnetic properties of the actuator on the other hand are taken into account separately, knowledge about these properties of the actuator is taken into account in a relatively specific and detailed manner, so that the calculations of the first and second control members are relatively accurate and the co-operation between the first and second control members is very effective. This limits the number of iterative calculations which have to be made by the control members before a required angle of rotation is achieved.

A special embodiment of an electrical actuator according to the invention is characterized in that the first control member comprises an adder which comprises an output for supplying the signal corresponding to the required electromagnetic torque, a first input for receiving a feed-forward control signal determined by the input signal corresponding to the required angle of rotation, a second input for receiving a feedback control signal determined by the input signal corresponding to the required angle of rotation and by a signal which is supplied by an angle-of-rotation sensor and which corresponds to a measured angle of rotation of the second actuator body, and a third input for receiving the output signal of the disturbance predictor. By adding said feed-forward and feedback control signals, a fast and accurate calculation and control of the required electromagnetic torque is achieved. The addition of the output signal of the disturbance predictor to the feed-forward and feedback control signals has the result that the feedback control signal need not be calculated in the feedback control loop of the control unit so as to include a component of the electromagnetic torque necessary for compensating for the disturbing loading torque. This improves the required convergence time of the feedback control loop, and consequently the response time of the control unit (still) further.

A further embodiment of an electrical actuator according to the invention is characterized in that the control unit comprises a comparator having a first input for receiving the signal corresponding to the required current, a second input for receiving a signal which is supplied by a current sensor and corresponds to a measured current through the energizing means, and an output for supplying a differential signal which is proportional to a difference between the signal corresponding to the required current and the signal corresponding to the measured current, the control unit further comprising a regulator with an input for receiving said differential signal and an output for supplying a signal corresponding to a current to be supplied to the energizing means. Said comparator, current sensor and regulator belong to a current-control loop of the control unit. Said regulator determines the signal corresponding to the electrical current supplied to the energizing means such that said differential signal is equalized to zero, so that the measured current through the energizing means accurately equals the required current determined by the control unit.

A still further embodiment of an electrical actuator according to the invention is characterized in that the disturbance observer has an input for receiving the signal corresponding to the measured current, the disturbance observer calculating the angle of rotation, an angular velocity of the second actuator body, and the loading torque on the basis of three state equations for the actuator. The signal corresponding to the measured current is supplied by the current sensor which is used in the current-control loop of the control unit. Since the control unit comprises a current-control loop, the value of the current through the energizing means of the actuator is imposed by the current-control loop and not by an electrical voltage imposed on the energizing means. The value of the current through the energizing means is thus prescribed by the current-control loop, so that the mathematical model of the actuator underlying the disturbance observer can dispense with a usual differential equation for the current as a function of an imposed voltage. Since for these reasons the mathematical model comprises only three state equations, the disturbance observer is relatively simple and suitable for on-line computation.

A special embodiment of an electrical actuator according to the invention is characterized in that the disturbance observer comprises a further input for receiving the signal corresponding to the measured angle of rotation, a comparator for determining a deviation between the measured angle of rotation and the calculated angle of rotation, and an adder for correcting the calculated angle of rotation, the calculated angular velocity, and the calculated loading torque by a value proportional to said deviation. In this embodiment, inaccuracies in the values of the angle of rotation, the angular velocity, and the loading torque calculated by the disturbance observer and caused by inaccuracies in the mathematical model underlying the disturbance observer are corrected by a feedback loop. The corrected angle of rotation is the sum of the calculated angle of rotation and the product of said deviation and a first weighting factor, the corrected angular velocity is the sum of the calculated angular velocity and the product of said deviation and a second weighting factor, and the corrected loading torque is the sum of the calculated loading torque and the product of said deviation and a third weighting factor, the first, second and third weighting factors being determined by means of a so-called pole-placement method.

Figure 2A:
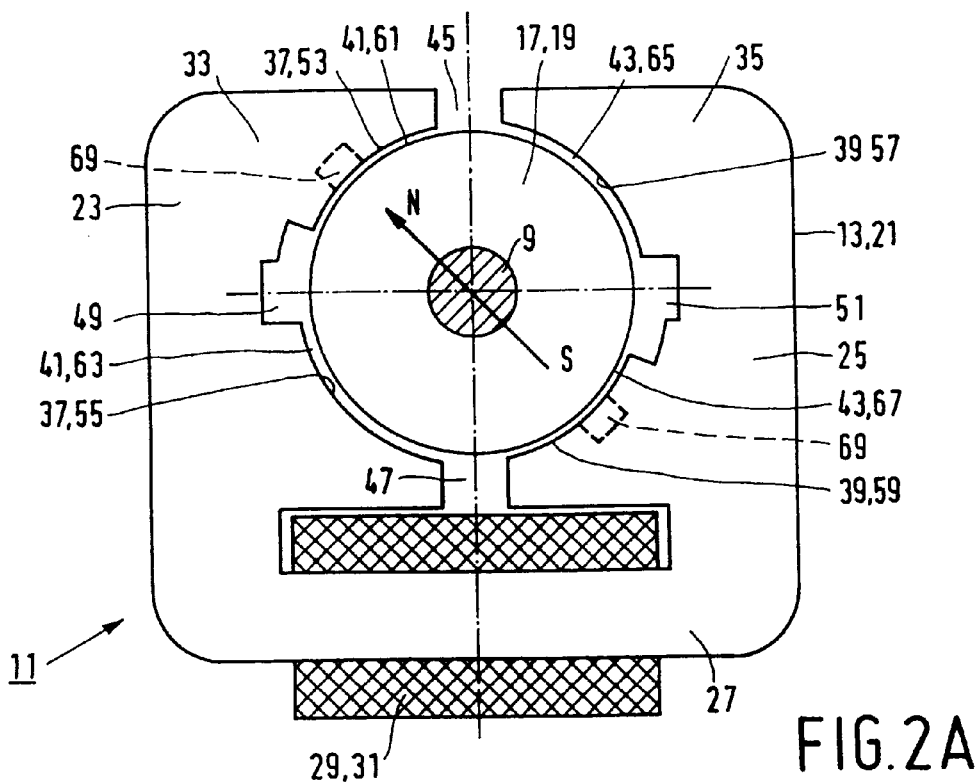
Figure 2B:
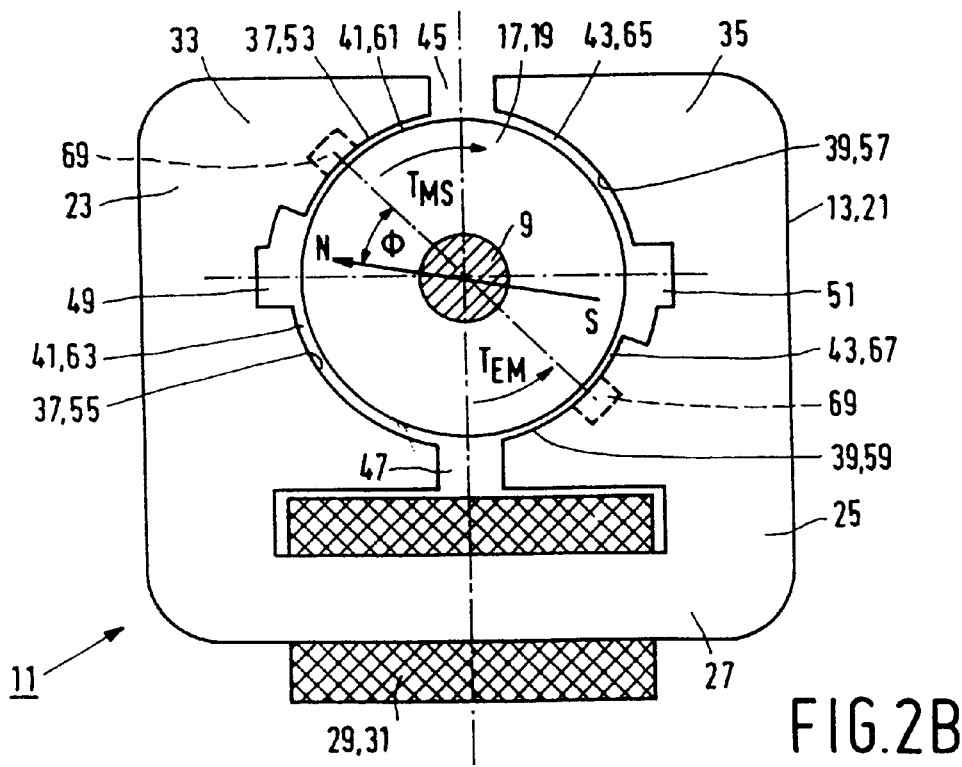
Figure 3:
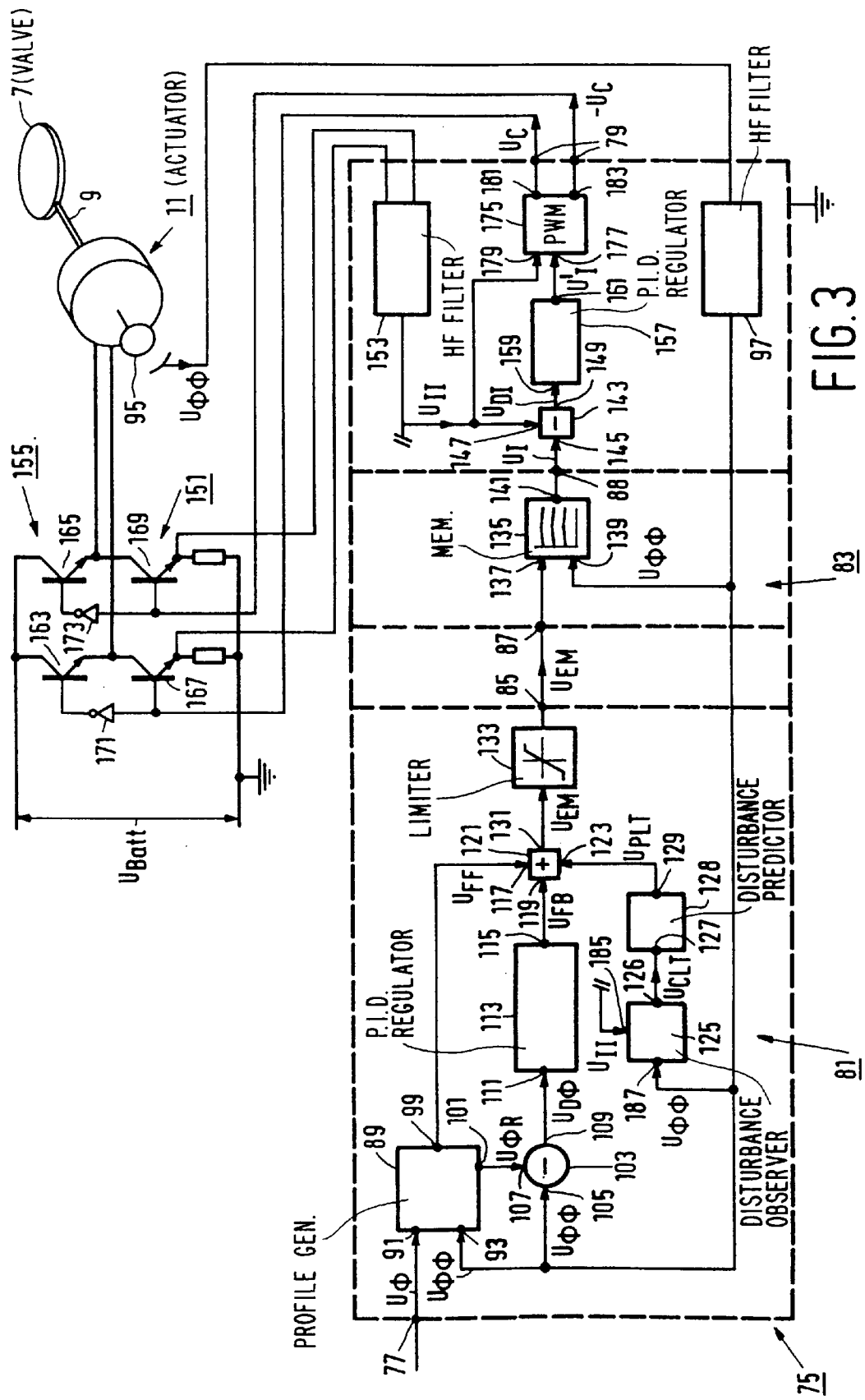
Figure 4A:
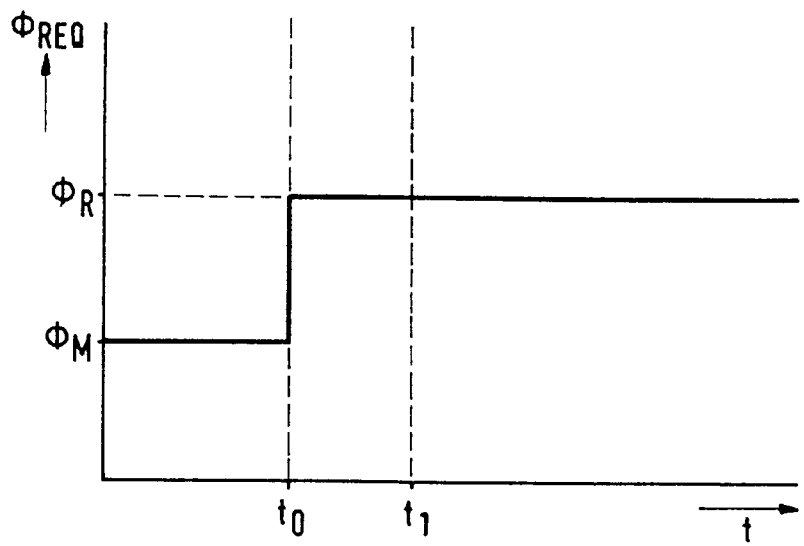
Figure 4B:
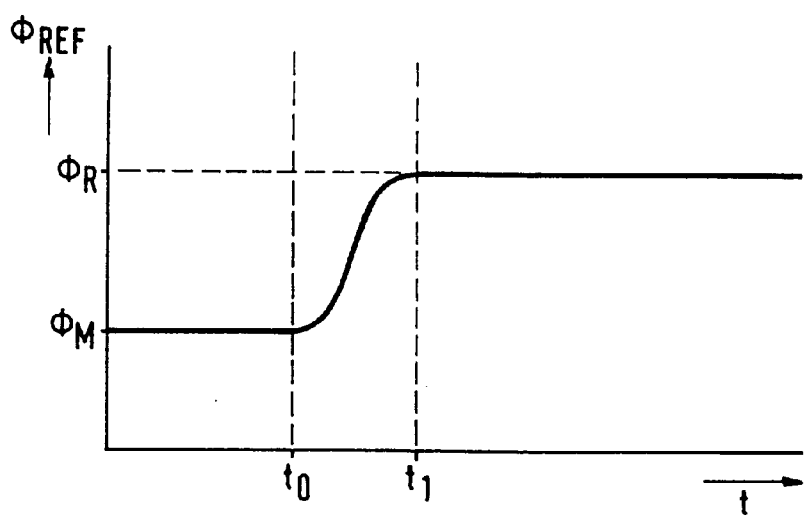
Figure 4C:
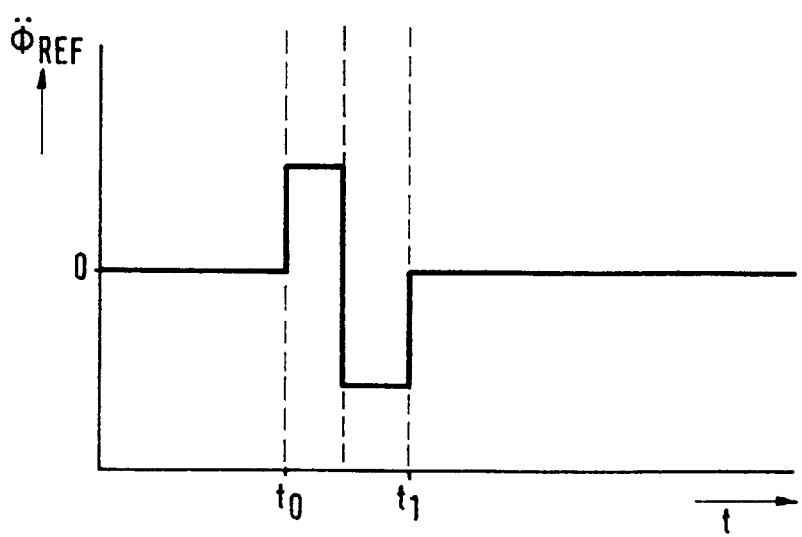
Figure 5:
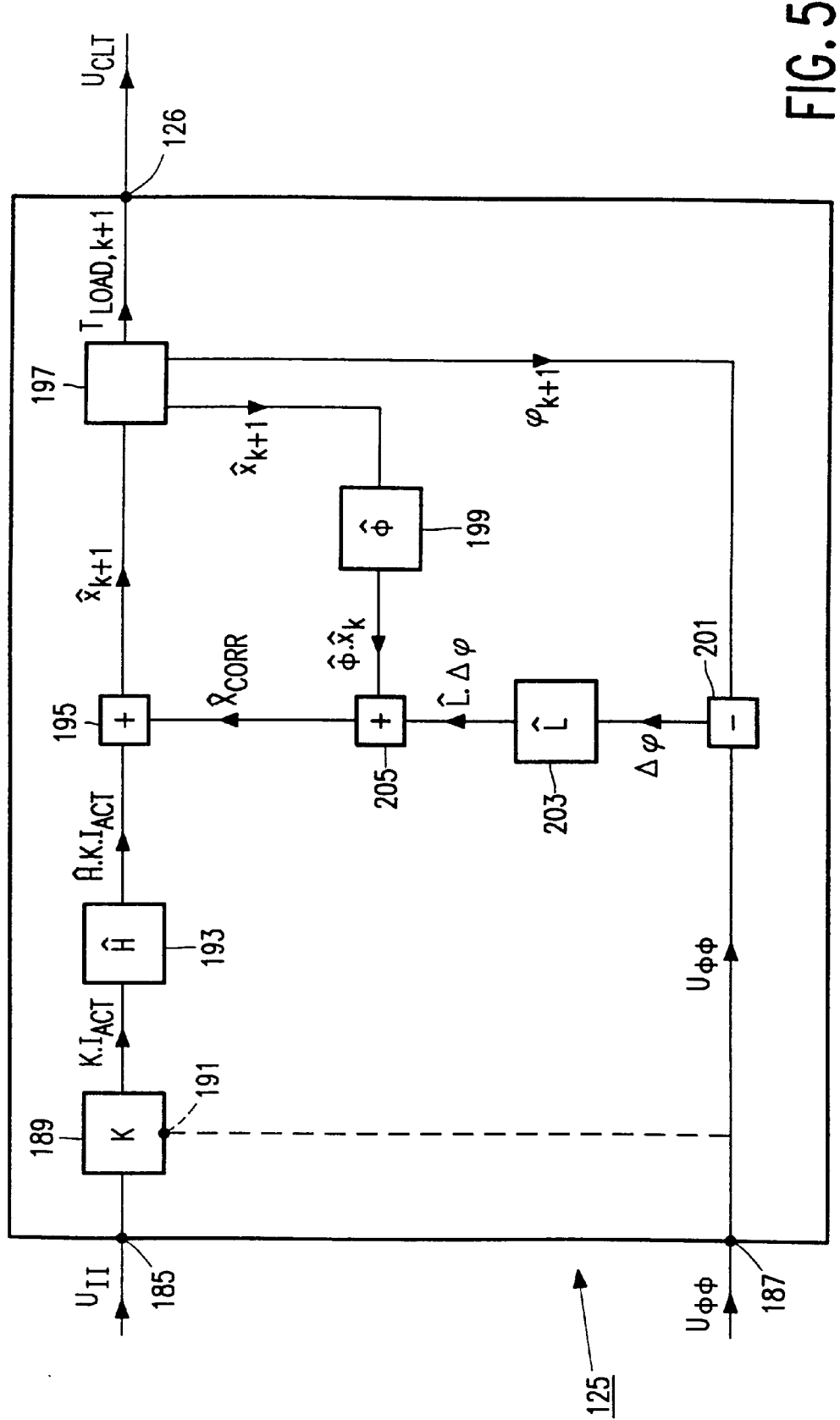
Figure 6B:
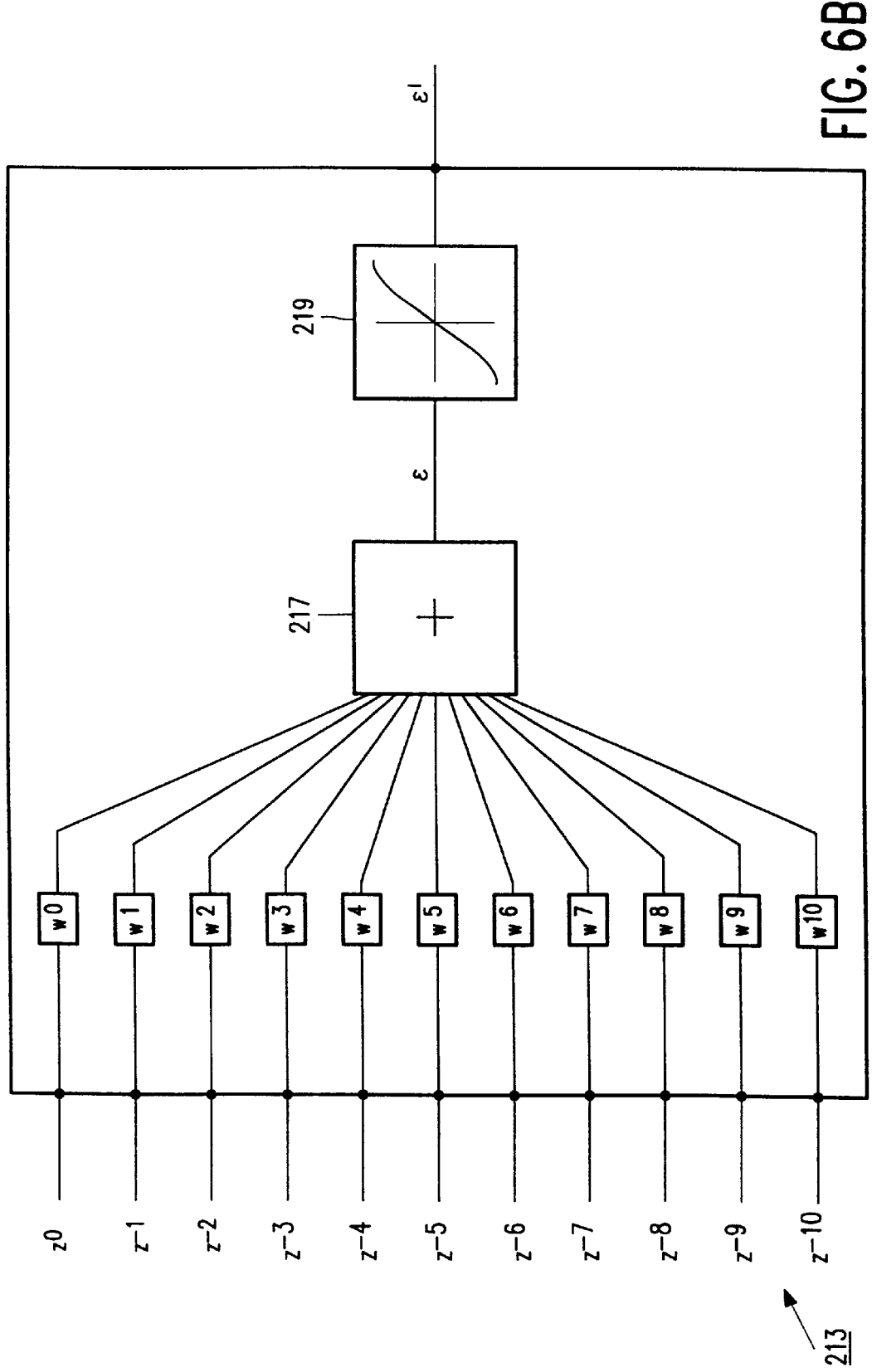
Figure 7:
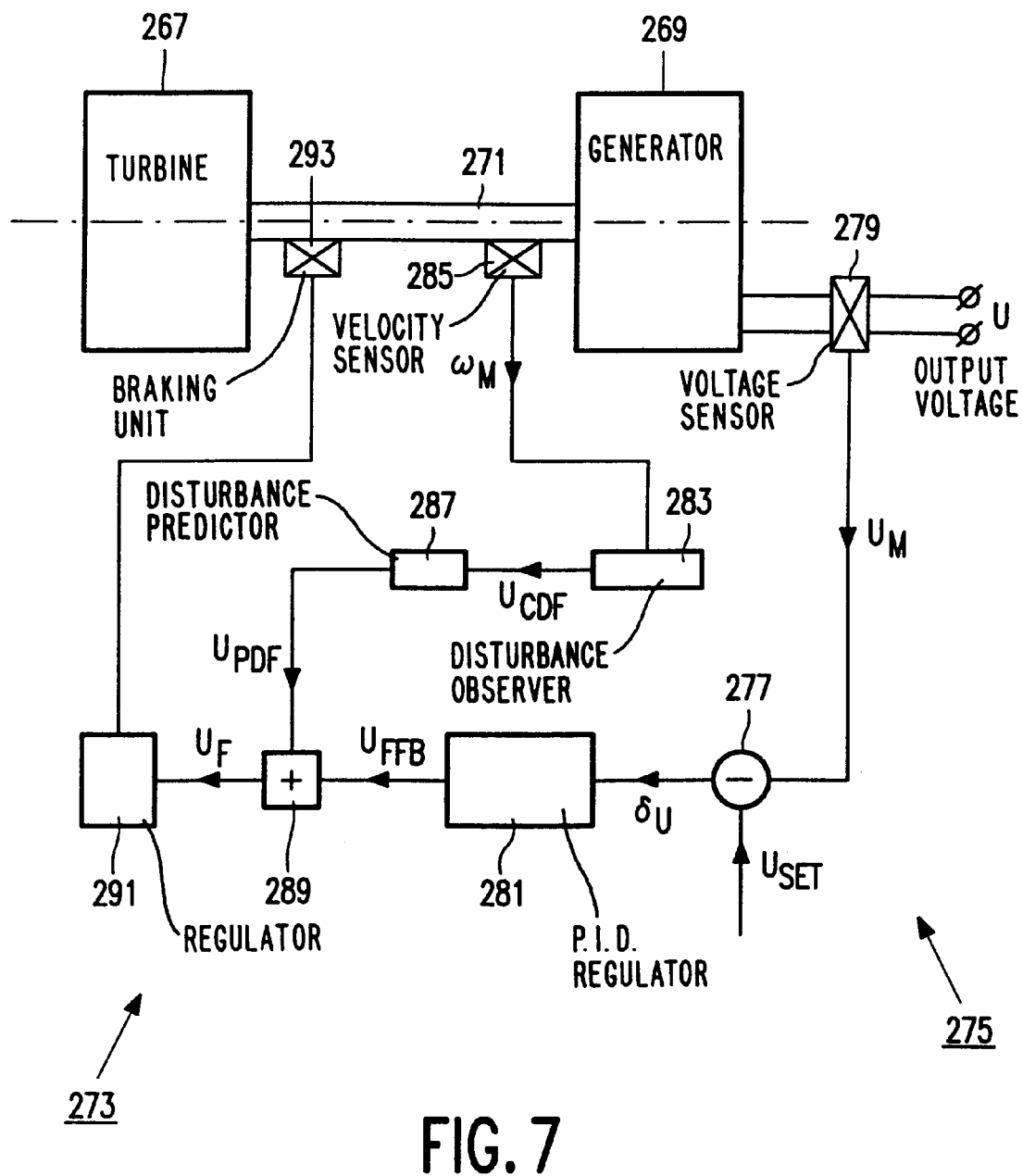

The invention will be explained in more detail below with reference to the drawing, in which FIG. 1 diagrammatically shows a throttle device according to the invention, used in an air inlet of an internal-combustion engine, FIG. 2a is a cross-section of an electrical actuator according to the invention, applied in the throttle device of FIG. 1, in a non-energized state, FIG. 2b shows the electrical actuator of FIG. 2a in an energized state, FIG. 3 schematically shows a control unit according to the invention, applied in the electrical actuator of FIG. 2a, FIG. 4a shows an angle-of-rotation-versus-time profile of the electrical actuator required by a motor-management system of the engine, FIG. 4b shows an angle-of-rotation-versus-time profile generated by a profile generator of the control unit of FIG. 3, FIG. 4c shows an angular-acceleration-versus-time profile corresponding to the angle-of-rotation-versus-time profile of FIG. 4b, FIG. 5 schematically shows a disturbance observer of the control unit of FIG. 3, FIG. 6a schematically shows a disturbance predictor of the control unit of FIG. 3, FIG. 6b schematically shows a single intermediate neuron of the disturbance predictor of FIG. 6a, and FIG. 7 schematically shows a generator device comprising a control unit in accordance with the invention.

The throttle device according to the invention shown in FIG. 1 comprises a throttle-valve housing 1 with a tubular air passage 3 and a flange 5 by means of which the throttle device can be connected to an air inlet or manifold of an internal-combustion engine not shown in the drawing. The throttle device further comprises a disc-shaped throttle valve 7 which is mounted on a shaft 9 extending diametrically through the air passage 3. The shaft 9 is pivotably journalled in the flange 5 of the throttle-valve housing 1, so that the throttle valve 7 is pivotable in the air passage 3. When the throttle valve 7 is pivoted, the aperture of the air passage 3 and the air flow to the combustion chambers of the internal-combustion engine are altered.

The throttle valve 7 is pivotable in the air passage 3 by means of an electrical actuator 11 comprising a first actuator body 13 which is mounted in an actuator housing 15 of the throttle-valve housing 1 and a second actuator body 17 which is mounted on the shaft 9. As FIGS. 2a and 2b show, the second actuator body 17 comprises a cylindrical permanent-magnet rotor body 19 which is diametrically magnetized and has a north pole N and a south pole S. The first actuator body 13 comprises a U-shaped stator body 21 made of a material having a high magnetic permeability, such as sintered iron, or of magnetic-steel laminations. The U-shaped stator body 21 comprises two limbs 23, 25 which are interconnected by a base 27. The electrical actuator 11 further comprises an energizing means 29 having an electrical coil 31 which is supported by the base 27. The limbs 23, 25 of the stator body 21 are each provided with a pole shoe 33, 35, which pole shoes 33, 35 each have a curved surface 37, 39. As FIGS. 2a and 2b show, the curved surfaces 37, 39 of the pole shoes 33, 35 surround the permanent-magnet rotor body 19, the surface 37 defining an air gap 41 between the rotor body 19 and the pole shoe 33 and the surface 39 defining an air gap 43 between the rotor body 19 and the pole shoe 35. Furthermore, a first gap 45 and a second gap 47 are present between the pole shoes 33, 35, while a first slot 49 is centrally provided in the surface 37 of the pole shoe 33, and a second slot 51 is centrally provided in the surface 39 of the pole shoe 35. In this way, the surface 37 is divided into a first surface portion 53 and a second surface portion 55, and the surface 39 is divided into a first surface portion 57 and a second surface portion 59, while the air gap 41 is divided into a first air-gap portion 61 and a second air-gap portion 63, and the air gap 43 is divided into a first air-gap portion 65 and a second air-gap portion 67. As FIGS. 2a and 2b show, the width of the diametrically opposed air-gap portions 61, 67 is smaller than the width of the diametrically opposed air-gap portions 63, 65.

Since the width of the air-gap portions 61, 67 is smaller than the width of the air-gap portions 63, 65, a magnetostatic torque $T_{MS}$ is exerted by the first actuator body 13 on the second actuator body 17, urging the second actuator body 17 into a rest position shown in FIG. 2a when the electrical coil 31 is not energized. To increase the magnetostatic torque $T_{MS}$, permanent auxiliary magnets 69, which are indicated in FIGS. 2a and 2b with broken lines, may alternatively be mounted in the first surface portion 53 of the pole shoe 33 and in the second surface portion 59 of the pole shoe 35. When the electrical coil 31 is energized, an electromagnetic torque $T_{EM}$ is exerted on the second actuator body 17, and the second actuator body 17 is pivoted from the rest position shown in FIG. 2a towards a position shown in FIG. 2b which is characterized by an angle of rotation φ of the second actuator body 17 relative to the rest position. If no external forces are exerted on the throttle-valve 7, the electromagnetic torque $T_{EM}$ equals the magnetostatic torque $T_{MS}$ in the position shown in FIG. 2b. When the current through the coil 31 is switched off, the second actuator body 17 and the throttle valve 7 will return to their rest position again under the influence of the magnetostatic torque $T_{MS}$. The value of the angle of rotation φ in the position shown in FIG. 2b is determined by the value of the electrical current through the electrical coil 31 and is adjustable through adjustment of the current through the coil 31 in a manner to be described below.

It is noted that the rest position of the electrical actuator 11 shown in FIG. 2a does not correspond exactly to a position of the second actuator body 17 and the throttle valve 7 in which the magnetostatic torque $T_{MS}$ exerted on the second actuator body 17 is zero. As FIG. 1 shows, the throttle device also comprises a mechanical stop 71, and the second actuator body 17 comprises a cam 73 which rests against the stop 71 when the coil 31 is not energized. Since the rest position of the second actuator body 17 in which the cam 73 rests against the stop 71 differs slightly from a position of the second actuator body 17 in which the magnetostatic torque $T_{MS}$ is zero, the cam 73 rests against the stop 71 under the influence of a magnetostatic torque $T_{MS,0}$. As FIG. 1 shows, this position corresponds to a so-called limp-home position of the throttle valve 7 in the air passage 3 which differs slightly from a so-called idling position of the throttle valve 7 in which the aperture of the air passage 3 is a minimum. In the limp-home position of the throttle valve 7, which occurs, for example, when the electrical-energy supply of the throttle device fails, the aperture of the air passage 3 allows for a small air flow towards the combustion chambers of the internal-combustion engine, so that an emergency operation of the engine is still possible. The stop 71 is mechanically adjustable, so that the air flow through the air passage 3 in the limp-home position of the throttle valve 7 is adjustable. In all other positions of the throttle valve 7, including the idling and full-throttle positions, in which the aperture of the air passage 3 is a minimum and a maximum, respectively, an electrical current is supplied through the coil 31.

As FIG. 1 shows, the electrical actuator 11 further comprises an electrical control unit 75 by means of which the angle of rotation $\phi$ of the throttle valve 7 is controlled. The control unit 75 is diagrammatically shown in FIG. 3 and comprises an electrical input 77 for receiving an electrical signal $u_\phi$ which corresponds to a required angle of rotation $\phi$ of the second actuator body 17 and the throttle valve 7, and an electrical output 79 for supplying an electrical signal $u_C$ which determines an electrical current through the energizing means 29 of the actuator 11. The signal $u_\phi$ is supplied by an electronic motor-management system of the internal-combustion engine, which system is not shown in the drawing. The motor-management system determines the value of the signal $u_\phi$ not only as a function of the position of an accelerator pedal operated by a driver, but also as a function of other parameters such as, for example, the r.p.m. of the engine, the pressure and temperature of the inlet air, and the engine temperature. Furthermore, the motor-management system controls the idling speed of the engine during and after a cold start of the engine, so that usual air-bypass systems are not necessary. The motor-management system also controls the fuel-injection and ignition devices of the engine. In this way, the operation of the fuel-injection, ignition and throttle devices of the engine are attuned to each other, so that the performance, the fuel consumption and the composition of the exhaust gases of the engine are improved.

As FIG. 3 further shows, the control unit 75 comprises a first control member 81 and a second control member 83. The first control member 81 comprises the electrical input 77 of the control unit 75 and an electrical output 85 for supplying an electrical signal $U_{EM}$ which corresponds to a required electromagnetic torque $T_{EM}$ to be exerted on the second actuator body 17. The second control member 83 comprises an electrical input 87 for receiving the signal $U_{EM}$ from the first control member 81 and an electrical output 88 for supplying an electrical signal $u_I$ which corresponds to a required electrical current through the energizing means 29.

As FIG. 3 shows, the first control member 81 comprises a profile generator 89 with a first electrical input 91 for receiving the signal $u_\phi$ and a second electrical input 93 for receiving an electrical signal $u_{\phi\phi}$ which corresponds to a measured angle of rotation of the second actuator body 17 and the throttle valve 7. The signal $u_{\phi\phi}$ is supplied by an angle-of-rotation sensor 95 of the throttle device via a usual high-frequency filter 97. As FIG. 1 shows, the angle-of-rotation sensor 95 is mounted on the throttle-valve housing 1 near an end of the shaft 9 which is remote from the electrical actuator 11. The profile generator 89 generates an angle-of-rotation-versus-time profile which extends from a measured actual angle of rotation $\phi_M$ to the required angle of rotation $\phi_R$. FIG. 4a shows an example of an angle-of-rotation-versus-time profile required by the motor-management system where the required angle of rotation discontinuously alters from $\phi_M$ to $\phi_R$ at a point in time $t_0$. Such a profile cannot be realized by the electrical actuator 11 because the necessary electromagnetic torque is infinitely high. FIG. 4b shows an angle-of-rotation-versus-time profile generated by the profile generator 89 where the angle of rotation smoothly runs from $\phi_M$ to $\phi_R$ between the points in time $t_0$ and $t_1$. FIG. 4c shows an angular-acceleration-versus-time profile which corresponds to the angle-of-rotation-versus-time profile of FIG. 4b. The profile generator 89 comprises a first electrical output 99 for supplying a feed-forward control signal $u_{FF}$ which is the product of an angular acceleration required according to the angular-acceleration-versus-time profile and a moment of inertia of the pivotable parts of the throttle device. The signal $u_{FF}$ therefore corresponds to an electromagnetic-torque component necessary for realizing said angular acceleration. The profile generator 89 further comprises a second electrical output 101 for supplying an electrical reference signal $u_{\phi R}$ which corresponds to the angle-of-rotation-versus-time profile generated by the profile generator 89. In this way, an instantaneous, discontinuous alteration of the signal $u_\phi$, which is supplied by the motor-management system, is convertible by the profile generator 89 into profiles of the feed-forward control signal $u_{FF}$ and the reference signal $u_{\phi R}$ which are feasible not only in view of the dynamic properties of the electrical actuator 11 but also in view of the controllability of the actuator 11.

As FIG. 3 further shows, the first control member 81 comprises a comparator 103 with a first electrical input 105 for receiving the signal $u_{\phi\phi}$ and a second electrical input 107 for receiving the reference signal $u_{\phi R}$. The comparator 103 comprises an electrical output 109 which supplies a differential signal $u_{D\phi}$ which is proportional to a difference between the signals $u_{\phi\phi}$ and $u_{\phi R}$. The differential signal $u_{D\phi}$ is supplied to an electrical input 111 of a PID-regulator 113 which further comprises an electrical output 115 for supplying a feedback control signal $u_{FB}$.

The feed-forward control signal $u_{FF}$ and the feedback control signal $u_{FB}$ are supplied to a first electrical input 117 and to a second electrical input 119, respectively, of an electrical adder 121 of the first control member 81. As FIG. 3 shows, the adder 121 further comprises a third electrical input 123 for receiving an electrical signal $u_{PLT}$ which corresponds to a predicted loading torque $T_{LP}$ exerted on the throttle valve 7 and the second actuator body 17. During operation, the throttle valve 7 and the second actuator body 17 are not only subject to the electromagnetic torque $T_{EM}$ and the magnetostatic torque $T_{MS}$ mentioned above, but also to other torques such as a torque caused by friction forces of the bearings of the shaft 9 and a torque caused by air-flow forces exerted on the throttle valve 7 by the air flowing through the air passage 3. The throttle device thus constitutes a system in which a first state variable, i.e. the angle of rotation $\phi$ of the throttle valve 7, is influenced by a disturbance variable, i.e. a loading torque comprising the magnetostatic torque $T_{MS}$, the torque caused by the friction forces, and the torque caused by the air-flow forces. The value of said first state variable is controlled by the control unit 75 which regulates the electromagnetic torque $T_{EM}$ of the electrical actuator 11. Since said loading torque is not directly measurable or measurable only with great difficulty, the first control member 81 of the control unit 75 comprises a so-called disturbance observer 125 for calculating the disturbance variable, i.e. the loading torque exerted on the second actuator body 17 and the throttle valve 7, on the basis of a mathematical model of the throttle device and the electrical actuator 11. The disturbance observer 125, which will be described in more detail below, comprises an electrical output 126 for supplying an electrical signal $u_{CLT}$ corresponding to a value of the loading torque calculated by the disturbance observer 125 at a first point in time. Said signal $u_{CLT}$ is supplied to an electrical input 127 of a disturbance predictor 128. The disturbance predictor 128, which will also be described in more detail below, comprises an electrical output 129 for supplying the signal $u_{PLT}$ corresponding to a value of the loading torque predicted for a second point in time which follows said first point in time by a predetermined time interval. The reason for using the disturbance predictor 128 will also be discussed below.

The adder 121 comprises an electrical output 131 for supplying the electrical signal $u_{EM}$ corresponding to the required electromagnetic torque to be exerted on the second actuator body 17. The signal $u_{EM}$ is the mathematical sum of the signals $u_{FF}$, $u_{FB}$ and $u_{PLT}$. In this way, the required electromagnetic torque $T_{EM}$ is the sum of the electromagnetic-torque component which is necessary for realizing the required angular acceleration of the throttle valve 7, an electromagnetic-torque component which is necessary for compensating for the predicted loading torque, and a feedback electromagnetic-torque component represented by the signal $u_{FB}$. The PID-regulator 113 determines the signal $u_{FB}$ such that the differential signal $u_{D\phi}$ is equalized to zero, so that the measured angle of rotation of the throttle valve 7 changes accurately in accordance with the angle-of-rotation-versus-time profile generated by the profile generator 89. Since the comparator 103 does not, as is usual, determine a difference between the signals $u_{\phi\phi}$ and $u_\phi$, but determines the difference between the signals $u_{\phi\phi}$ and $u_{\phi R}$, the control of the signal $u_{FB}$ by the PID-regulator 113 is very stable, so that usual wind-up effects and dynamic overshoot of the PID-regulator 113 do not occur. Furthermore, the control of the signal $u_{FB}$ by the PID-regulator 113 is very fast as a result of the use of the adder 121. Since the signals $u_{FF}$ and $u_{PLT}$ are added to the signal $u_{FB}$, the PID-regulator 113 need not calculate the electromagnetic-torque component necessary for realizing the required angular acceleration of the throttle valve 7 and the electromagnetic-torque component necessary for compensating for the predicted loading torque. The calculation of these electromagnetic-torque components by a PID-controller in a feedback control loop would demand several controller sampling times, the more so as the relation between the magnetostatic torque $T_{MS}$ and the angle of rotation φ is strongly non-linear, so that the response time of the control unit 75 would deteriorate and the risk of instabilities of the PID-controller would increase. With the adder 121, the PID-regulator 113 need only calculate a relatively small deviation between the predicted loading torque and a loading torque actually influencing the throttle valve 7 and the second actuator body 17. The response time and accuracy of the control unit 75 are improved thereby.

As FIG. 3 shows, the first control member 81 further comprises an electrical limiter 133 for limiting the signal $u_{EM}$ when the signal $u_{EM}$ exceeds a predetermined limit value. Said limit value of the signal $u_{EM}$ is determined in such a way that the electromagnetic torque exerted on the second actuator body 17 and on the throttle valve 7 will never exceed a predetermined maximum torque value. In this way, mechanical damage or malfunctioning of the electrical actuator 11 as well as overheating of the energizing means 29 are avoided. When the signal $u_{EM}$ supplied by the adder 121 exceeds said predetermined limit value, the value of the signal $u_{EM}$ is adjusted to said limit value by the limiter 133.

As FIG. 3 further shows, the second control member 83 of the control unit 75 comprises an electrical memory 135 with a first electrical input 137 for receiving the signal $u_{EM}$ from the input 87 of the second control member 83, a second electrical input 139 for receiving the signal $u_{\phi\phi}$ from the angle-of-rotation sensor 95, and an electrical output 141 for supplying the electrical signal $u_I$ which corresponds to an electrical current through the electrical coil 31 of the energizing means 29 necessary for achieving the required electromagnetic torque $T_{EM}$. The value of the electromagnetic torque $T_{EM}$ is dependent on the angle of rotation φ of the second actuator body 17 and on the value of the electrical current through the coil 31. The relation between the electromagnetic torque $T_{EM}$, the angle of rotation φ and the current through the coil 31 depends on the structure and composition of the first and second actuator bodies 13, 17 and the energizing means 29. Said relation is calculated or measured and is stored in a tabular form in the memory 135. In this way, the value of the current necessary for achieving a required electromagnetic torque at the measured angle of rotation is read out from the memory 135 in an accurate and simple manner without substantial delay. It is noted that a calculation of the required current by a usual calculator would demand a substantial amount of time, the more so as the relation between the electromagnetic torque, the angle of rotation and the current is strongly non-linear. With the use of the memory 135, the short response time of the control unit 75 obtained by the PID-regulator 113 in combination with the adder 121 is not deteriorated by the second control member 83.

The control unit 75 further comprises a comparator 143 having a first electrical input 145 for receiving the signal $u_I$ from the output 88 of the second control member 83, a second electrical input 147 for receiving an electrical signal $u_{II}$ which corresponds to a measured electrical current through the energizing means 29, and an electrical output 149 for supplying a differential signal $u_{DI}$ which is proportional to a difference between the signals $u_I$ and $u_{II}$. The signal $u_{II}$ is supplied by an electrical-current sensor 151 via a usual high-frequency filter 153. The current sensor 151 measures the electrical current which is supplied to the energizing means 29 by a power end stage 155 of the electrical actuator 11. In FIG. 3, the current sensor 151 and the power end stage 155 are shown diagrammatically only. Furthermore, the control unit 75 comprises a PI-regulator 157 with an electrical input 159 for receiving the differential signal $u_{DI}$ and an electrical output 161 for supplying an electrical signal $u'_I$ which corresponds to the electrical current to be supplied to the energizing means 29 by the power end stage 155. The PI-regulator 157 determines the signal $u'_I$ such that the differential signal $u_{DI}$ is equalized to zero, so that the measured current supplied by the power end stage 155 to the energizing means 29 equals the required current determined by the second control member 83.

As FIG. 3 further shows, the power end stage 155 of the electrical actuator 11 is fed by a constant electrical voltage from, for example, a battery. The power end stage 155 comprises four NPN-transistors, i.e. two upper transistors 163, 165 and two lower transistors 167, 169, and two electrical invertors 171, 173. The transistors 163, 165, 167, 169 and the invertors 171, 173 are interconnected in a usual bridge configuration. The transistors 163, 165, 167, 169 are driven in a usual manner by a pulse-width modulator 175 of the control unit 75, which comprises a first electrical input 177 for receiving the signal u'$_I$ supplied by the PI-regulator 157 and a second electrical input 179 for receiving the signal u$_{II}$ supplied by the current sensor 151. A first electrical output 181 of the pulse-width modulator 175 is connected to the base of lower transistor 167, and via the invertor 171 to the base of upper transistor 163, while a second electrical output 183 of the pulse-width modulator 175 is connected to the base of lower transistor 169, and via the invertor 173 to the base of upper transistor 165. The signal u'$_I$ is converted by the pulse-width modulator 175 into mutually complementary pulsatory drive signals u$_C$ and −u$_C$ at the first and second electrical outputs 181, 183, respectively, of the pulse-width modulator 175. In dependence on the polarity of the drive signals u$_C$ and −u$_C$, either the lower transistor 167 and the upper transistor 165 are opened, whereby an electrical current in the energizing means 29 is admitted in one direction, or the lower transistor 169 and the upper transistor 163 are opened, whereby an electrical current in the energizing means 29 is admitted in the opposite direction. The pulse-width modulator 175 further comprises an electrical limiter for limiting the pulse width of the drive signals u$_C$ and −u$_C$ when the signal u$_{II}$ supplied by the current sensor 151 exceeds a predetermined limit value. In this way, the pulse width of the electrical current through the coil 31 is limited to a value which is feasible in view of the thermal properties of the energizing means 29. An overcurrent in the coil 31, which could lead to overheating of the energizing means 29 and the electrical actuator 11, is avoided in this way.

The control unit 75 described above has a so-called cascade control structure according to which the signal u$_\phi$ corresponding to a required angle of rotation is first converted into a signal corresponding to a required angular acceleration, the signal corresponding to the required angular acceleration being subsequently converted into a signal u$_{EM}$ corresponding to a required electromagnetic torque, and the signal u$_{EM}$ corresponding to the required electromagnetic torque being finally converted into a signal u$_I$ corresponding to a required electrical current through the energizing means 29. As described above, this refined cascade control structure with the first and second control members 81, 83 allows for a specific calculation of the required electromagnetic torque T$_{EM}$ which takes into account the mechanical properties of the electrical actuator 11 and the disturbing loading torque predicted by the disturbance predictor 128, and for a specific calculation of the required current which takes into account the electromagnetic properties of the actuator 11. This refined cascade control structure leads to a response time of the control unit 75 which is short relative to common and usual control structures according to which the required current is calculated in an iterative manner by a feedback control loop without or with fewer intermediate control steps. Said common and usual control structures would require a high number of iterative calculations and therefore would lead to a long response time, particularly because the relation between the required current and the angle of rotation is strongly non-linear.

As was mentioned above, the disturbance observer 125 is used for calculating the loading torque exerted on the second actuator body 17 and the throttle valve 7 on the basis of a mathematical model of the throttle device and the electrical actuator 11, so that a difficult and unreliable measurement of the loading torque is avoided. The mathematical model underlying the disturbance observer 125 is based on a set of three first-order differential equations which read as follows:

$$J \cdot d\omega/dt = k(\phi) \cdot I_{ACT} - T_{LOAD} \quad [1]$$

$$\omega = d\phi/dt \quad [2]$$

$$dT_{LOAD}/dt = 0 \quad [3]$$

Equation [1] is an equation of motion of the throttle valve 7 and the second actuator body 17, wherein J is the moment of inertia of the pivotable parts of the throttle device, ω is the angular velocity of the pivotable parts of the throttle device, k(φ).I$_{ACT}$ is the electromagnetic torque T$_{EM}$ exerted on the second actuator body 17, k(φ) being a factor which is dependent on the angle of rotation φ and I$_{ACT}$ being the current through the energizing means 29, and T$_{LOAD}$ is the loading torque exerted on the throttle valve 7 and the second actuator body 17. Equation [2] describes the relation between the angular velocity ω and the angle of rotation φ of the throttle valve 7. Equation [3] comprises a simplifying assumption for the loading torque, namely that the loading torque is constant.

Since the value of the current I$_{ACT}$ through the energizing means 29 is determined by the PI-regulator 157 of the control unit 75 and not by the electrical voltage with which the power end stage 155 of the electrical actuator 11 is fed, the mathematical model underlying the disturbance observer 125 can dispense with a fourth differential equation describing a relation between the current through the energizing means 29 and the voltage applied to the energizing means 29. As FIG. 3 shows, the disturbance observer 125 has a first electrical input 185 for receiving the signal u$_{II}$ supplied by the current sensor 151 and corresponding to the measured electrical current through the energizing means 29. The disturbance observer 125 calculates the angle of rotation φ, the angular velocity ω, and the loading torque T$_{LOAD}$ on the basis of the input signal u$_{II}$ and the three differential equations [1], [2] and [3] given above. Since the mathematical model underlying the disturbance observer 125 comprises only three first-order differential equations, the disturbance observer 125 is relatively simple and suitable for on-line computation.

In a matrix form, the set of equations [1], [2] and [3] reads as follows:

$$\begin{pmatrix} d\phi/dt \\ d\omega/dt \\ dT_{LOAD}/dt \end{pmatrix} = \begin{pmatrix} 0 & 1 & 0 \\ 0 & 0 & -1/J \\ 0 & 0 & 0 \end{pmatrix} \cdot \begin{pmatrix} \phi \\ \omega \\ T_{LOAD} \end{pmatrix} + \begin{pmatrix} 0 \\ 1/J \\ 0 \end{pmatrix} \cdot k(\phi) \cdot I_{ACT}.$$

Furthermore, the disturbance observer 125 is based on the following discretizations:

$$\phi_{k+1} = \phi_k + T \cdot \omega_k + T^2/2J \cdot k(\phi) \cdot I_{ACT} - T^2/2J \cdot T_{LOAD,k};$$

$$\omega_{k+1} = \omega_k + T/J \cdot k(\phi) \cdot I_{ACT} - T/J \cdot T_{LOAD,k};$$

wherein φ$_{k+1}$ and ω$_{k+1}$ are the values of the angle of rotation and the angular velocity calculated by the disturbance observer 125 at a point in time k+1; φ$_k$, ω$_k$, and T$_{LOAD,k}$ are the values of the angle of rotation, the angular velocity, and the loading torque calculated by the disturbance observer 125 at a point in time k; and T is a time interval between the points in time k and k+1. With these discretizations, the set of equations [1], [2] and [3] in matrix form reads as follows:

$$x_{k+1} = \Phi \cdot x_k + H \cdot k(\phi) \cdot I_{ACT};$$

with $$x_k = \begin{pmatrix} \phi_k \\ \omega_k \\ T_{LOAD,k} \end{pmatrix}; \quad x_{k+1} = \begin{pmatrix} \phi_{k+1} \\ \omega_{k+1} \\ T_{LOAD,k+1} \end{pmatrix};$$

The vectors $x_k$ and $x_{k+1}$ are the state vectors for the points in time k and k+1, the matrix $\Phi$ is the system matrix, and the matrix H is the input matrix.

$$\Phi = \begin{pmatrix} 1 & T & T^2/2J \\ 0 & 1 & -T/J \\ 0 & 0 & 1 \end{pmatrix}; \quad H = \begin{pmatrix} T^2/2J \\ T/J \\ 0 \end{pmatrix}.$$

The equations [1], [2] and [3] are implemented in the disturbance observer 125 in the form of a computer program. FIG. 5 diagrammatically shows the disturbance observer 125 in the form of a number of function blocks representing the computer program. As mentioned above, the disturbance observer 125 comprises a first electrical input 185 for receiving the signal $u_I$ corresponding to the measured current $I_{ACT}$ through the energizing means 29. Furthermore, the disturbance observer 125 comprises a second electrical input 187 for receiving the signal $u_{\phi\phi}$ corresponding to the measured angle of rotation. The signal $u_{\phi\phi}$ is used by the disturbance observer 125 in a manner to be described below. As FIG. 5 further shows, the disturbance observer 125 comprises a first function block 189 for multiplying the value $I_{ACT}$ by a constant factor K representing an average value of the factor $k(\phi)$. Alternatively, the function block 189 may contain a relation between $k(\phi)$ and $\phi$, for example, in a tabular form, in which case the function block 189 comprises an input 191 for receiving the input signal $u_{\phi\phi}$. In FIG. 5, the alternative input 191 is shown with a broken line. The disturbance observer 125 further comprises a second function block 193 for multiplying the input matrix H by the value $K.I_{ACT}$ or by the value $k(\phi).I_{ACT}$, an output of the function block 193 representing the vector $H.k(\phi).I_{ACT}$. The disturbance observer 125 further comprises a third function block 195 for adding up the vector $H.k(\phi).I_{ACT}$ and a vector $x_{CORR}$ to be described below, an output of the third function block 195 representing the new state vector $x_{k+1}$. Furthermore, the disturbance observer 125 comprises a fourth function block 197 for supplying the component $T_{LOAD,k+1}$ of the new state vector $x_{k+1}$ to the output 126 of the disturbance observer 125. Furthermore, the fourth function block 197 leads the state vector $x_{k+1}$ to a fifth function block 199 which multiplies the state vector $x_{k+1}$ by the system matrix $\Phi$. An output of the fifth function block 199 represents the value $\Phi.x_k$.

As was described above, the disturbance observer 125 calculates the values of the angle of rotation $\phi$, the angular velocity $\omega$, and the loading torque $T_{LOAD}$ on the basis of the set of equations [1], [2] and [3]. Since the value of the angle of rotation $\phi$ is also measured by the angle-of-rotation sensor 95, the measured value of the angle of rotation can be used to correct inaccuracies in the mathematical model underlying the disturbance observer 125 and inaccuracies in the discretizations of the equations [1], [2] and [3]. For this purpose, the disturbance observer 125 comprises a sixth function block 201 for comparing the measured value of the angle of rotation represented by the input signal $u_{\phi\phi}$ with the calculated value $\phi_{k+1}$ of the angle of rotation which is supplied by the fourth function block 197. An output value $\Delta\phi$ of the sixth function block 201 corresponds to a deviation between said measured angle of rotation and said calculated angle of rotation and is led to a seventh function block 203 which multiplies a corrector matrix L by the value $\Delta\phi$. The corrector matrix L comprises a first weighting factor $L_1$, a second weighting factor $L_2$, and a third weighting factor $L_3$ for correcting the calculated value of the angle of rotation, the calculated value of the angular velocity, and the calculated value of the loading torque, respectively, said weighting factors being determined by means of a so-called pole-placement method which is known and usual per se. An output vector $L.\Delta\phi$ of the seventh function block 203 is led to an eighth function block 205 of the disturbance observer 125 which is used for adding up the output vector $L.\Delta\phi$ of the seventh function block 203 and the vector $\Phi.x_k$. In this manner, an output vector $x_{CORR}$ of the eighth function block 205 reads as follows:

$$x_{CORR} = \Phi \cdot x_k + L \cdot \Delta\phi;$$

with $$L = \begin{pmatrix} L_1 \\ L_2 \\ L_3 \end{pmatrix}.$$

Therefore, the new state vector $x_{k+1}$ reads as follows:

$$x_{k+1} = \Phi.x_k + H.k(\phi).I_{ACT} + L.\Delta\phi.$$

As was discussed above, the disturbance observer 125 supplies an electrical signal $u_{CLT}$ corresponding to a value of the loading torque calculated by the disturbance observer 125 at a first point in time. If the control unit 75 were not provided with the disturbance predictor 128, the electrical signal $u_{CLT}$ would be further processed by the first control member 81 and the second control member 83 of the control unit 75 and would be finally converted by the electrical actuator 11 into an electromagnetic-torque component compensating for the calculated loading torque. As a result of a period of time necessary for the control unit 75 to process the signal $u_{CLT}$ and a further period of time necessary for the electrical actuator 11 to generate the required electromagnetic-torque component compensating for the calculated loading torque, a time delay would occur between the first point in time at which the disturbance observer 125 calculates the loading torque and a further point in time at which the electrical actuator 11 would actually realize the electromagnetic-torque component compensating for the loading torque calculated by the disturbance observer 125 at the first point in time. If the loading torque is an oscillating loading torque having a relatively high frequency, a relatively great phase shift would occur between the oscillating loading torque and the electromagnetic-torque component compensating for the loading torque calculated by the disturbance observer 125, so that the oscillating loading torque would not be correctly compensated for by the electrical actuator 11. If the oscillating loading torque has a cycle time equal to said time delay between the first point in time and said further point in time, the throttle valve 7 would even get into resonance. In the throttle device according to the invention, oscillating loading torques having such a relatively high frequency are caused by air-flow oscillations and by turbulences arising from the operating principle of the internal-combustion engine, particularly from the fact that the inlet valves of the combustion chambers of the engine are periodically opened and closed during operation. Said air-flow oscillations would lead to unwanted oscillating pivotal motions of the throttle valve 7 in the air passage 3.

As was mentioned above, the disturbance predictor 128 of the control unit 75 supplies an output signal $u_{PLT}$ corresponding to a value of the loading torque predicted for a second point in time which follows the first point in time by a predetermined time interval. Said predetermined time interval corresponds to the time delay which occurs between the first point in time at which the disturbance observer 125 calculates the value of the loading torque and said further point in time at which the electrical actuator 11 would actually realize the electromagnetic-torque component compensating for the loading torque calculated by the disturbance observer 125 at the first point in time if the control unit 75 were not provided with the disturbance predictor 128. In this manner, the disturbance predictor 128 compensates for said time delay by supplying the output signal $u_{PLT}$ which anticipates the input signal $u_{CLT}$ of the disturbance predictor 128 by the predetermined time interval corresponding to said time delay. Thus the electromagnetic-torque component compensating for the loading torque calculated by the disturbance observer 125 is substantially in phase with the loading torque actually exerted on the throttle valve 7 and the second actuator body 17, so that the electrical actuator 11 accurately compensates for the loading torque even at high frequencies of the loading torque, i.e. at a high r.p.m. of the internal-combustion engine.

As FIG. 6a shows, the disturbance predictor 128 comprises an artificial neural network 207 which is implemented in the disturbance predictor 128 in the form of a computer program. FIG. 6a diagrammatically shows the disturbance predictor 128 in the form of a number of function blocks representing said computer program. The neural network 207 comprises an input memory 209 having eleven memory positions $z^0, z^{-1}, \ldots, z^{-10}$ for storing eleven values of the loading torque calculated by the disturbance observer 125 at eleven successive points in time up to and including the first point in time $t_0$. At the first point in time $t_0$, the last value of the loading torque calculated by the disturbance observer 125 is stored in memory position $z^0$, while the previous values of the calculated loading torque are each pushed down to a next memory position $z^{-1}, z^{-2}, \ldots, z^{-10}$. The neural network 207 further comprises a layer 211 of eleven intermediate neurons 213. Each intermediate neuron 213 receives the eleven values of the calculated loading torque from the input memory 209, the connections between the input memory 209 and the intermediate neurons 213 being indicated in FIG. 6a by a single line 215 for the sake of simplicity. FIG. 6b diagrammatically shows a single intermediate neuron 213. As FIG. 6b shows, the intermediate neurons 213 each comprise eleven function blocks $w_0, w_1, \ldots, w_{10}$ for multiplying the eleven values of the calculated loading torque by a weighting factor, and an adder 217 for adding up the eleven values supplied by the function blocks $w_0, w_1, \ldots, w_{10}$. In this manner, an output value $\epsilon$ of the adder 217 of each of the intermediate neurons 213 corresponds to a weighted value of the eleven values of the calculated loading torque. Said output value $\epsilon$ is processed by a further function block 219 of the intermediate neuron 213 comprising an output Sigmoid function which is known and usual per se and supplying an output value $\epsilon'$ of the intermediate neuron 213. As FIG. 6a further shows, the neural network 207 of the disturbance predictor 128 further comprises a layer 221 of five output neurons 223, 225, 227, 229 and 231. The output neurons 223, 225, 227, 229 and 231 each have a structure similar to the structure of the intermediate neurons 213 shown in FIG. 6b. Each output neuron 223, 225, 227, 229, 231 receives the eleven weighted values $\epsilon'$ supplied by the eleven intermediate neurons 213, the connections between the eleven intermediate neurons 213 and the five output neurons 223, 225, 227, 229 and 231 being indicated in FIG. 6a by a single line 233 for the sake of simplicity. As indicated in FIG. 6a, the output neuron 223 supplies a first weighted value $\zeta_1$ of the eleven weighted values $\epsilon'$ of the intermediate neurons 213, while the output neurons 225, 227, 229 and 231 supply a second weighted value $\zeta_2$, a third weighted value $\zeta_3$, a fourth weighted value $\zeta_4$, and a fifth weighted value $\zeta_5$, respectively, of the eleven weighted values $\epsilon'$ of the intermediate neurons 213. As will be explained below, the fifth weighted value $\zeta_5$ corresponds to a value of the loading torque predicted for a point in time $t_1 = t_0 + \Delta t$, the fourth weighted value $\zeta_4$ corresponds to a value of the loading torque predicted for a point in time $t_2 = t_0 + 2\Delta t$, the third weighted value $\zeta_3$ corresponds to a value of the loading torque predicted for a point in time $t_3 = t_0 + 3\Delta t$, the second weighted value $\zeta_2$ corresponds to a value of the loading torque predicted for a point in time $t_4 = t_0 + 4\Delta t$, while the first weighted value $\zeta_1$ corresponds to a value of the loading torque predicted for a point in time $t_5 = t_0 + 5\Delta t$, said point in time $t_5$ corresponding to said second point in time, and the period of time of $5 \cdot \Delta t$ corresponding to the predetermined time interval between the first point in time and the second point in time mentioned above.

As FIG. 6a further shows, the disturbance predictor 128 is provided with a so-called backpropagation network 235 which is adapted for training the intermediate neurons 213 and the output neurons 223, 225, 227, 229 and 231 of the neural network 207 in a manner to be described above. The backpropagation network 235 comprises five memories 237, 239, 241, 243 and 245, and five comparators 247, 249, 251, 253 and 255. The memory 237 is used for storing the value $\zeta_1$, which corresponds to the loading torque predicted for the second point in time $t_5 = t_0 + 5 \cdot \Delta t$, during a time period of $5 \cdot \Delta t$. Subsequently, at the second point in time $t_5$, the comparator 247 determines a deviation $\delta_1$ between the value $\zeta_1$ and a value of the loading torque actually calculated by the disturbance observer 125 at the second point in time $t_5$. In the same way, the memories 239, 241, 243 and 245 are used for storing the values $\zeta_2, \zeta_3, \zeta_4$ and $\zeta_5$ during a time period of $4 \cdot \Delta t, 3 \cdot \Delta t, 2 \cdot \Delta t$ and $\Delta t$, respectively, while the comparators 249, 251, 253 and 255 are used for determining a deviation $\delta_2$ between the value $\zeta_2$ and a value of the loading torque calculated by the observer 125 at the point in time $t_4$, a deviation $\delta_3$ between the value $\zeta_3$ and a value of the loading torque calculated by the observer 125 at the point in time $t_3$, a deviation $\delta_4$ between the value $\zeta_4$ and a value of the loading torque calculated by the observer 125 at the point in time $t_2$, and a deviation $\delta_5$ between the value $\zeta_5$ and a value of the loading torque calculated by the observer 125 at the point in time $t_1$, respectively. The deviations $\delta_1, \delta_2, \delta_3, \delta_4$ and $\delta_5$ are used to train the intermediate neurons 213 and the output neurons 223, 225, 227, 229 and 231 of the neural network 207, i.e. the weighting factors of the neurons 213, 223, 225, 227, 229 and 231 are recalculated in dependence on said deviations according to a gradient search method which is known and usual per se. In this manner, the neurons 213, 223, 225, 227, 229 and 231 are trained such that the deviations $\delta_1, \delta_2, \delta_3, \delta_4$ and $\delta_5$ are minimized, so that at a first point in time the values $\zeta_1, \zeta_2, \zeta_3, \zeta_4$ and $\zeta_5$ correspond to a value of the loading torque calculated by the observer 125 at a point in time following said first point in time by a time period of $5 \cdot \Delta t, 4 \cdot \Delta t, 3 \cdot \Delta t, 2 \cdot \Delta t$ and $\Delta t$, respectively, wherein the time period of $5 \cdot \Delta t$ corresponds with the predetermined time interval between the first point in time and the second point in time as discussed above.

In the disturbance predictor 128 shown in FIG. 6a, the neurons 213, 223, 225, 227, 229 and 231 are only trained if at least one of the deviations $\delta_1, \delta_2, \delta_3, \delta_4$ and $\delta_5$ is above a predetermined margin. In that case, the neural network 207 is in a so-called learning phase. If the deviations $\delta_1$, $\delta_2$, $\delta_3$, $\delta_4$ and $\delta_5$ are each below said predetermined margin, the weighting factors of the neurons 213, 223, 225, 227, 229 and 231 are kept constant and the neural network 207 is in a so-called test phase. During operation, the neural network 207 returns from the test phase to the learning phase if, for example, the properties of the loading torque such as its frequency or amplitude change. In this manner, the disturbance predictor 128 is a self-learning, robust system which is able to predict the value of the loading torque in an accurate manner also when the properties of the loading torque change. As FIG. 6a further shows, the disturbance predictor 128 comprises a further function block 257 having a first input 259 which is directly connected to the input 127 of the disturbance predictor 128 for receiving the output signal $u_{CLT}$ of the disturbance observer 125, a second input 261 for receiving the weighted value $\zeta_1$ of the output neuron 223 corresponding to the value of the loading torque predicted for the second point in time, and an output 263 connected to the output 129 of the disturbance predictor 128. The function block 257 has a switching function and communicates with the comparators 247, 249, 251, 253 and 255 as shown diagrammatically by a line 265 in FIG. 6a. If the deviations $\delta_1$, $\delta_2$, $\delta_3$, $\delta_4$ and $\delta_5$ determined by the comparators 247, 249, 251, 253 and 255 are each below the predetermined margin and the neural network 207 is in the test phase, the output 263 of the switching-function block 257 supplies an output signal $u_{PLT}$ corresponding to the predicted value $\zeta_1$, whereas the output 263 of the switching-function block 257 supplies an output signal $u_{CLT}$ corresponding to the output signal $u_{CLT}$ of the disturbance observer 125 if the neural network 207 is in the learning phase. When the neural network 207 is in the learning phase, the neural network 207 may produce a value $\zeta_1$ which strongly deviates from the value of the loading torque actually exerted at the second point in time, so that the stability of the throttle device may be disturbed. Since the output 263 of the switching-function block 257 is directly connected to the input 127 of the disturbance predictor 128 when the neural network 207 is in the learning phase, it is prevented that the disturbance predictor 128 supplies an output signal corresponding to said deviating value $\zeta_1$ in the learning phase of the neural network 207.

It is noted that the electrical actuator according to the invention may alternatively be applied in other devices, in which the angular position of a shaft should be controlled to a constant or variable reference angle. The electrical actuator may, for example, be used in servo-actuated valves in chemical plants and power stations or in devices for deflecting the control surfaces of an aircraft. The actuator may be used as a so-called prime actuator without a transmission, in which case the actuator directly drives a body which is to be displaced, as in the embodiment of the invention described above, or in combination with a transmission for converting a rotational motion into another rotational motion or into a linear motion, in which case the linear position of a body can be accurately controlled by the electrical actuator.

In the electrical actuator 11 described above, the first actuator body 13 exerts a magnetostatic torque on the second actuator body 17, said magnetostatic torque being dependent on the angle of rotation of the second actuator body 17 relative to the first actuator body 13. It is noted that the invention also relates to other types of electrical actuators with a first actuator body, a second actuator body which is pivotable relative to the first actuator body through a limited angle of rotation, energizing means for exerting an electromagnetic torque on the second actuator body, and a control unit for controlling said angle of rotation. The actuator may, for example, be provided with a mechanical torsion spring for exerting a mechanical spring torque on the second actuator body instead of or in addition to the magnetostatic torque. In such a case, the disturbance observer 125 is based on a modified mathematical model of the electrical actuator which also takes into account the torque of said mechanical spring.

As was discussed above, the disturbance predictor 128 of the control unit 75 comprises an artificial neural network 207 for predicting a value of the loading torque for the second point in time. It is further noted that in accordance with the invention the disturbance predictor 128 of the control unit 75 may also comprise a different kind of processor. An example of such an alternative processor is a so-called multiple memory loop which is usual and known per se. Such a memory loop comprises a large number of memory positions and can be used as follows as a disturbance predictor. The values of the oscillating disturbance variable or loading torque successively calculated by the disturbance observer up to and including the first point in time are stored in the memory loop. In accordance with a predetermined periodicity criterion, the memory loop determines which of the values successively stored belong to a single cycle of the oscillating disturbance variable. If the memory loop has determined a single cycle of the disturbance variable, the value of the disturbance variable for the second point in time can be determined from said determined single cycle as a value which anticipates the value calculated at the first point in time by said predetermined time interval.

The neural network 207 of the disturbance predictor 128 described before comprises an input memory 209 having eleven memory positions, a layer 211 of eleven intermediate neurons 213, and a layer 221 of five output neurons 223, 225, 227, 229 and 231. It is noted that according to the invention the neural network 207 may alternatively comprise an input memory having a different number of memory positions, a different number of intermediate neurons, and a different number of output neurons. For obtaining a high accuracy of the value of the predicted disturbance variable or loading torque, the neural network 207 should contain an input memory with a sufficient number, for example 10 or more, of memory positions, a sufficient number, for example 10 or more, of intermediate neurons, and a sufficient number, for example 5 or more, of output neurons. However, if a lower accuracy of the value of the predicted disturbance variable is allowable, for example when the disturbance variable has a relatively low frequency, the neural network 207 may contain an input memory with a smaller number, for example four or more, of memory positions, a smaller number, for example four or more, of intermediate neurons, and a smaller number, for example one or more, of output neurons.

It is further noted that according to the invention the switching-function block 257 may be omitted in the disturbance predictor 128. In such an alternative embodiment of the control unit according to the invention, the output signal $\zeta_1$ of the neural network 207 is always supplied to the output 129 of the disturbance predictor 128. The switching-function block 257 may be omitted in the disturbance predictor 128 without disturbing the stability of the throttle device if the learning phase of the neural network 207 is short with respect to the test phase of the neural network 207, for example if the properties of the oscillating disturbance variable or loading torque change very gradually only.

As was described above, the control unit 75 is used to control a first state variable, i.e. the angle of rotation φ, of a system, i.e. the throttle device comprising the throttle valve 7, which is influenced during operation by a disturbance variable, i.e. the loading torque exerted on the throttle valve 7. It is finally noted that the invention also covers other kinds of systems in which a control unit is used to control a first state variable of the system which is influenced by a disturbance variable during operation. Said first state variable may be, for example, a position, the disturbance variable being an external force influencing said position. However, the first state variable may also be another kind of variable such as, for example, a temperature, a pressure, or an electrical voltage, the disturbance variable being, for example, an electrical current or a heat flow influencing said temperature, an external heat source or an external force influencing said pressure, or an electromagnetic field influencing said electrical voltage. An example of such an alternative system is a generator device for generating a constant electrical voltage $U_{SET}$ as shown diagrammatically in FIG. 7. The generator device comprises a turbine 267 and an electricity generator 269 which is driven by the turbine 267 via a shaft 271. The generator 269 produces an electrical voltage U having a value which is determined by an angular velocity ω of the shaft 271. To obtain a constant electrical voltage U, the angular velocity ω should be as constant as possible. During operation, the angular velocity ω is disturbed by a number of disturbing variables such as, for example, oscillating bearing forces of the bearings of the shaft 271, the rotating parts of the turbine 267 and the rotating parts of the generator 269 which particularly occur at high velocities of the shaft 271.

As FIG. 7 shows, the generator device comprises a control unit 273 for controlling the electrical voltage U supplied by the generator 269. The control unit 273 comprises a feedback control loop 275 having a comparator 277 for determining a deviation δU between a voltage $U_M$ measured by a voltage sensor 279 and a required value $U_{SET}$ of the voltage, and a PID-regulator 281 for determining a signal $u_{FFB}$ corresponding to a braking force exerted on the shaft 271 necessary to make the deviation δU equal to zero. Furthermore, the control unit 273 comprises a disturbance observer 283 having an input for receiving a signal corresponding to a value of the angular velocity $ω_M$ measured by an angular-velocity sensor 285. An output signal $u_{CDF}$ of the disturbance observer 283 corresponds to a value of the disturbing bearing forces calculated by the disturbance observer 283 on the basis of a mathematical model of the generator system. The control unit 275 further comprises a disturbance predictor 287 for supplying an output signal $u_{PDF}$ corresponding to a value of the disturbing bearing forces predicted for a future point in time. An adder 289 adds up the signals $u_{FFB}$ and $u_{PDF}$, and a regulator 291 transforms the signal $u_{FFB}+u_{PDF}$ into a signal supplied to a braking unit 293. The disturbance predictor 287 compensates for a time delay which occurs between a first point in time at which the observer 283 calculates the bearing force and a second point in time at which the braking unit 293 actually realizes a braking force compensating for the bearing force calculated at the first point in time. An accurate control of the voltage U is also obtained at relatively high angular velocities of the shaft 271 in this way.

We claim:

1. An electrical actuator comprising:
  a first actuator body and a second actuator body which is pivotable relative to the first actuator body through an angle of rotation about an axis of rotation;
  electrical energizing means for exerting an electromagnetic torque on the second actuator body; and
  a control unit for controlling the angle of rotation of the second actuator body, said control unit comprising
    (i) a first control member with an input for receiving an input signal corresponding to a required angle of rotation of the second actuator body, and an output for supplying a control signal corresponding to a required electromagnetic torque on the second actuator body; and
    (ii) a second control member with an input for receiving the control signal corresponding to the required electromagnetic torque and an output for supplying an output signal corresponding to a required electrical current through said energizing means;
  wherein the first control member incorporates a disturbance observer and a disturbance predictor; the disturbance observer calculating, on the basis of a mathematical model of the actuator, a disturbance variable relating to the torque exerted on the second actuator body and supplying an output signal corresponding to a value of said disturbance variable as calculated at a first point in time; the output signal of the disturbance observer being supplied to an input of the disturbance predictor, which has an output for supplying an output signal corresponding to a value of the disturbance variable as predicted for a second point in time which follows the first point in time by a predetermined time interval.

2. An electrical actuator as claimed in claim 1, characterized in that the first control member comprises an adder which comprises an output for supplying the signal corresponding to the required electromagnetic torque, a first input for receiving a feed-forward control signal determined by the input signal corresponding to the required angle of rotation, a second input for receiving a feedback control signal determined by the input signal corresponding to the required angle of rotation and by a signal which is supplied by an angle-of-rotation sensor and which corresponds to a measured angle of rotation of the second actuator body, and a third input for receiving the output signal of the disturbance predictor.

3. An electrical actuator as claimed in claim 1, characterized in that the control unit comprises a comparator having a first input for receiving the signal corresponding to the required current, a second input for receiving a signal which is supplied by a current sensor and corresponds to a measured current through the energizing means, and an output for supplying a differential signal which is proportional to a difference between the signal corresponding to the required current and the signal corresponding to the measured current, the control unit further comprising a regulator with an input for receiving said differential signal and an output for supplying a signal corresponding to a current to be supplied to the energizing means.

4. An electrical actuator as claimed in claim 3, characterized in that the disturbance observer has an input for receiving the signal corresponding to the measured current, the disturbance observer calculating the angle of rotation, an angular velocity of the second actuator body, and the loading torque on the basis of three state equations for the actuator.

5. An electrical actuator as claimed in claim 4, characterized in that the disturbance observer comprises a further input for receiving the signal corresponding to the measured angle of rotation, a comparator for determining a deviation between the measured angle of rotation and the calculated angle of rotation, and an adder for correcting the calculated angle of rotation, the calculated angular velocity, and the calculated loading torque by a value proportional to said deviation.

6. A throttle device for use in an air inlet of an internal-combustion engine, which throttle device comprises a throttle-valve housing, an air passage which is connectable to the air inlet, a throttle value which is journalled in the throttle-valve housing so as to be pivotable in the air passage, and an electrical actuator for pivoting the throttle valve, characterized in that the electrical actuator is an electrical actuator as claimed in claim 1.

* * * * *